United States Patent
Burlingame et al.

(10) Patent No.: US 8,940,256 B2
(45) Date of Patent: Jan. 27, 2015

(54) METHOD FOR RECYCLING OF RARE EARTH AND ZIRCONIUM OXIDE MATERIALS

(71) Applicants: Nicholas H. Burlingame, Belmont, NY (US); Samuel Burlingame, Belmont, NY (US)

(72) Inventors: Nicholas H. Burlingame, Belmont, NY (US); Samuel Burlingame, Belmont, NY (US)

(73) Assignee: Xylon Technical Ceramics, Inc., Alfred, NY (US)

( * ) Notice: Subject to any disclaimer, the term of this patent is extended or adjusted under 35 U.S.C. 154(b) by 42 days.

(21) Appl. No.: 13/706,546

(22) Filed: Dec. 6, 2012

(65) Prior Publication Data
US 2013/0171047 A1     Jul. 4, 2013

Related U.S. Application Data

(60) Provisional application No. 61/630,255, filed on Dec. 7, 2011.

(51) Int. Cl.
*C01F 17/00* (2006.01)
*C22B 59/00* (2006.01)
*C22B 7/00* (2006.01)

(52) U.S. Cl.
CPC ................ *C22B 59/00* (2013.01); *C22B 7/006* (2013.01)
USPC ........... 423/21.1; 423/21.5; 423/263; 423/69; 423/81; 423/608

(58) Field of Classification Search
None
See application file for complete search history.

(56) References Cited

U.S. PATENT DOCUMENTS

| | | | |
|---|---|---|---|
| 1,995,334 | A | 3/1935 | Svensen |
| 2,160,148 | A | 5/1939 | Hunyady |
| 2,520,958 | A | 9/1950 | Poole |
| 2,525,474 | A | 10/1950 | Blumenthal |
| 2,801,153 | A | 7/1957 | Dwyer |
| 3,057,685 | A | 10/1962 | Kamlet |
| 3,389,005 | A | 6/1968 | Kloepfer |
| 3,740,200 | A | 6/1973 | Gautier |
| 3,761,563 | A | 9/1973 | Kaiser et al. |
| 4,283,377 | A | 8/1981 | Fenner |

(Continued)

FOREIGN PATENT DOCUMENTS

| | | |
|---|---|---|
| FR | 2668764 | 11/1991 |
| JP | 2009083082 | 4/2009 |

OTHER PUBLICATIONS

PCT/US2012/068397—An Unofficial International Search Report and Written Opinion Issued March 15, 2013 for PCT/US2012/068397 Filed Dec. 7, 2012; Correcponding to U.S. Appl. No. 13/706,546; Inventors Burlingame et al.

(Continued)

*Primary Examiner* — Steven Bos
(74) *Attorney, Agent, or Firm* — Duane C. Basch; Basch & Nickerson LLP

(57) ABSTRACT

A method is presented for recovery, in reusable form, of rare earth minerals and zirconia from waste materials containing them. The method includes: mixing an ammonium sulfate powder and a powder containing the oxide waste material; heating the mixture to decompose the waste into a residue; dissolving the residue in water; separating rare earth constituents from the solution; and subsequently using the separated rare earth constituent (salt or solution) as a raw material. Moreover, the reactants used in the recovery may be recovered by appropriate precipitation and concentration operations.

32 Claims, 6 Drawing Sheets

(56) References Cited

U.S. PATENT DOCUMENTS

| | | |
|---|---|---|
| 4,464,344 A | 8/1984 | Saikkonen |
| 4,822,575 A | 4/1989 | Ngian et al. |
| 5,129,945 A | 7/1992 | Lyman et al. |
| 5,595,714 A | 1/1997 | Ripa et al. |
| 5,961,938 A | 10/1999 | Yamamoto |
| 6,255,242 B1 | 7/2001 | Umemoto et al. |
| 6,296,824 B1 | 10/2001 | Leppert |
| 7,976,798 B2 | 7/2011 | Otto et al. |
| 2002/0184972 A1 | 12/2002 | Williams et al. |
| 2003/0113254 A1 | 6/2003 | Belov et al. |
| 2005/0180911 A1 | 8/2005 | Belov et al. |
| 2011/0182786 A1 | 7/2011 | Burba |
| 2011/0206580 A1 | 8/2011 | Porob et al. |

OTHER PUBLICATIONS

JP2009083082—Machine translation of JP2009083082 published Apr. 23, 2009; filed Oct. 3, 2007 as JP application 2007-259735; Inventor Ito Yoshiichi et al.; Applicant AGC Seimi Chemical Co Ltd.

FR2668764—Abstract of FR2668764 published May 7, 1992; application FR19910013702 filed Nov. 7, 1990; Inventor Lee Ernest.

JP2009083082—Abstract and Machine Translation of publication JP2009083082 published Apr. 23, 2009; JP application 2007259735 filed Oct. 3, 2007; Applicant AGC Seimi Chemical Co Ltd; Inventors Yoshiichi et al.

METHOD FOR RECYCLING OF RARE EARTH AND ZIRCONIUM OXIDE MATERIALS

This application claims priority from U.S. Provisional Patent Application No. 61/630,255, for "Method of Recycling Oxide Materials," filed Dec. 7, 2012 by Nicholas H. Burlingame, which is hereby incorporated by reference in its entirety.

Disclosed herein is a method and process for recovery, in reusable form, of rare earth minerals (rare earths) and zirconia from waste materials. More specifically, the method includes mixing an ammonium sulfate powder and a powder containing the oxide waste material; firing the mixture at a temperature sufficient to decompose the waste into a residue, which is, to a large degree, soluble in aqueous solution; dissolving the residue in water to obtain a solution, which comprises rare earth constituents in salt form; separating rare earth constituents from the solution using at least one separation method; and subsequently using the separated rare earth constituent (salt or solution) as a raw material.

BACKGROUND AND SUMMARY

Rare earth and zirconium oxide materials are critical for a broad range of technologies. Important industrial sectors such as defense, manufacturing, energy, transportation, optics and electronics all utilize rare earth materials in abundance. Rare earths exist as integral components in many technologies, including navigation/guidance systems, petroleum refining catalysts, advanced vehicle batteries, wind turbine motors, jet engines, miniature disk drives, speakers, televisions and monitors, compact fluorescent light bulbs and optical cables. Additionally, there are currently a limited number of economically viable sources of rare earths, making the recycling of rare earths an invaluable practice to industry. However, only a small percent of all rare earth minerals are recycled. The disclosed embodiments provide a simple method for the recycling of oxide materials that is especially suited for rare earth containing materials and zirconia containing materials.

Disclosed in embodiments herein is a method for recovery, in reusable form, of rare earth minerals from waste materials containing rare earth minerals and zirconia. Such waste materials may be produced by a number of industrial processes, including thermal spray coating, electron beam vapor deposition, green machining of dental materials, and cubic zirconium gem production. The basics of this method consist of the following: a) mixing an ammonium sulfate powder and a powder containing oxide waste material; b) firing the mixture at a temperature sufficient to decompose a waste residue, which is, to a large degree, soluble in aqueous solution; c) dissolving the residue in water to obtain a solution that includes rare earth constituents in salt form; d) separating rare earth constituents from the solution using at least one separation method; and e) subsequently using the separated rare earth constituent (salt or solution) as a raw material. If these waste materials occur in coatings, the coatings are removed by treating the material in a concentrated ammonium sulfate solution to cover the surface, and then heating the coated part to allow the ammonium sulfate to preferentially digest and disrupt the coating. The zirconia may be further recovered from the waste filtrate in (d) via precipitation or other separation methods. The reactants used in the recovery may also be recovered by appropriate precipitation and concentration of the filtrate produced in (d).

Further disclosed in embodiments herein is a method for recovery, in reusable form, of rare earth minerals from waste materials containing rare earth minerals but no zirconia. Such waste materials are produced by compact fluorescent light bulbs, rare earth containing catalysts, rare earth-iron alloy magnets, lanthanum manganate fuel cell electrodes, and NiMH batteries. If such materials occur in coatings, a method is also disclosed for removal of the coatings containing these wastes. The steps involved are the same as above pertaining to the reactions to which the materials are subjected, except that an oxalate precipitation agent is used to precipitate the rare earth minerals in (d) in the absence of zirconia. Additionally, if the rare earth waste materials are non-oxides, the materials must be oxidized prior to reaction with ammonium sulfate. If such materials occur in coatings, the materials are treated in a saturated ammonium sulfate solution to coat the surface with ammonium sulfate, which allows for a preferential chemical attack on the coated surface to effect removal of the materials.

Also disclosed herein is a method for the recovery of zirconia from zircon, which is a typical waste produced by metal casting operations.

Figure 1:
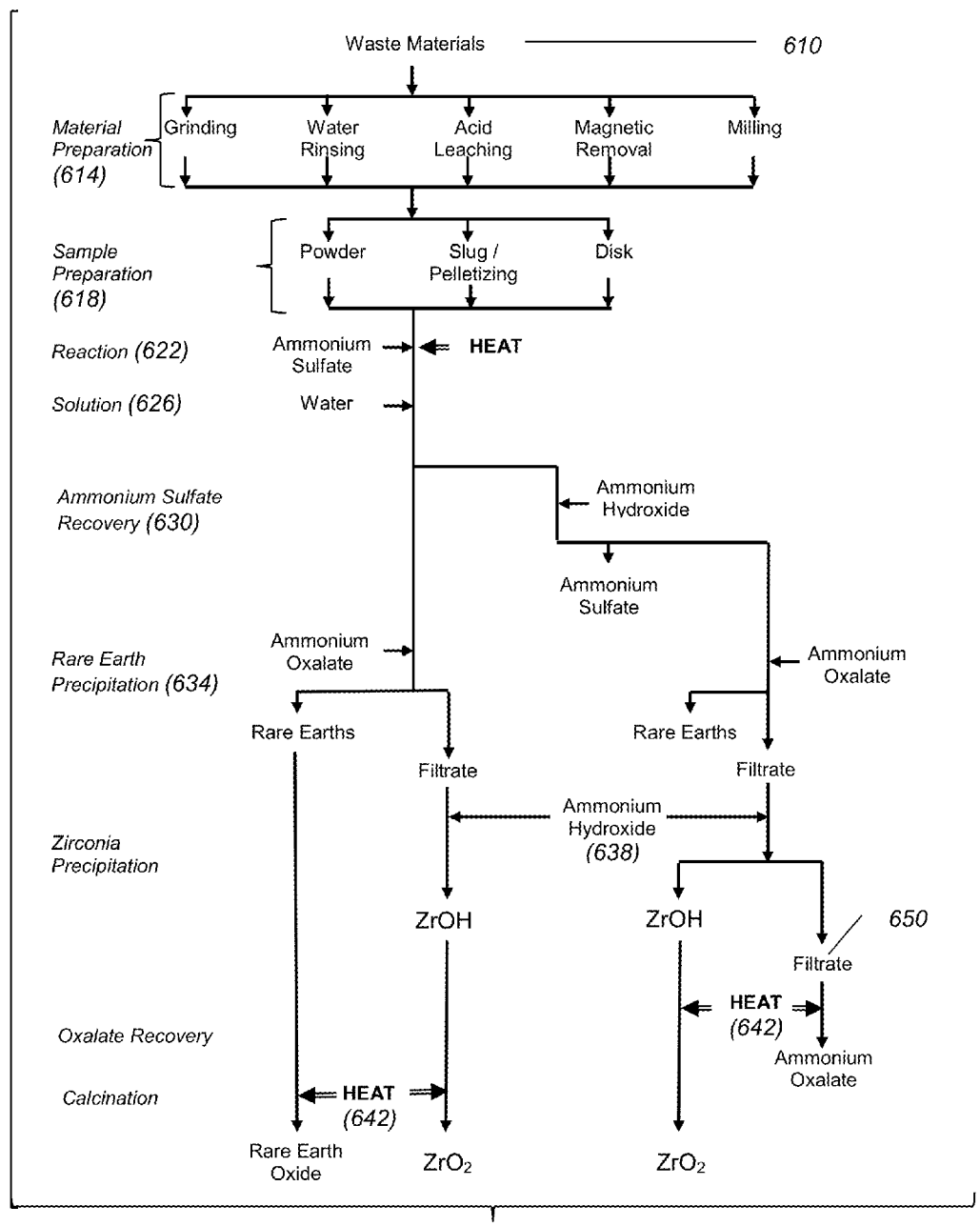
FIG. 1 is a flow diagram representing an exemplary process as disclosed herein.

The various embodiments described herein are not intended to limit the disclosure to those embodiments described. On the contrary, the intent is to cover all alternatives, modifications, and equivalents as may be included within the spirit and scope of the various embodiments, examples and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

According to one embodiment disclosed herein, a method is presented for recovering rare earth materials and zirconia from waste materials. The rare earths and zirconia recovered are directly reusable as raw materials. The processes producing these wastes include thermal spray coating, electron beam vapor deposition, green machining of dental wastes, and cubic zirconium gem production. These waste materials are characterized by compounds such as yttria-zirconia and $Gd_2O_3$—$ZrO_2$. In some cases these wastes require cleaning by one or a combination of cleaning methods, including magnetic removal of tramp iron materials, acid leaching, and water rinsing to remove water-soluble materials.

Materials which are not oxides require heating in oxidizing conditions to convert them to oxides. As described below, including the non-limiting examples, various heating times and temperatures are employed in the heating operations and it should be appreciated that while a particular time and temperature combination may be disclosed, heating may also be accomplished under equivalent conditions. For example, heating at a lower temperature for a longer time period or at a higher temperature for a shorter time period. It should be noted, however, that heating at temperatures far exceeding the noted temperature may result in undesirable changes that preclude decomposition of the waste material.

The oxide materials and ammonium sulfate are then individually pulverized before mixing or pelletized and mixed in proportion of approximately 1 to 6 moles of ammonium sulfate to mole of waste oxide, more preferably in proportion of about 1.5 to 3.5 moles of ammonium sulfate to mole of waste oxide. The mixture is then fired in boats, which may be open or closed. The boats may be composed of Pyrex, alumina, graphite, or stainless steel, and are placed in heating devices such as continuous kilns, periodic kilns, and autoclaves at temperatures from about 150 to 700° C., more preferably 300 to 600° C., and most preferably 350 to 500° C. It is also possible to fire the mixtures in rotating kilns, in which case they may be fired without boats. The mixtures may also be fired in microwave ovens wherein either a microwave susceptible material such as carbon black is added to the mixture if the waste material is not itself microwave susceptible, or the mixture may be fired in a microwave susceptible container. In some cases the firing of the rare earth wastes and ammonium sulfate is repeated, as many as three times.

In cases in which the waste materials are contained in coatings, sufficient ammonium sulfate is sprinkled on or applied to the coated surfaces of the component to melt and form a liquid layer completely covering or wetting the coated component surfaces, and then the component part is heated to at least 400° C. in a crucible. The temperature is held for approximately ten minutes before the waste component is removed, cooled and rinsed. The rinsing steps are repeated multiple times, possibly five or more, to effect complete removal of the coating.

Upon completion of the sulfation step, the residue, which is, to a large degree, soluble in aqueous solution is dissolved in water to obtain a solution containing salts of the rare earth minerals and zirconium. The rare earth constituents are separated from the solution using methods such as ion-exchange, solvent extraction, fractional crystallization, and/or precipitation. For example, precipitation with an oxalate precipitation agent, such as excess oxalic acid or ammonium oxalate, is suitable. The rare earth oxalate precipitate is washed one or more times with about a 2% oxalic acid solution. Finally, the rare earth precipitate is calcined at about 1000° C. to form the rare earth oxide.

The zirconia is recovered by treating the filtrate generated by the oxalate precipitation with ammonium hydroxide to form a hydrous zirconia precipitate. This precipitate is subsequently washed and calcined at about 1000° C. to form zirconium oxide.

The ammonium sulfate may be recovered by reacting the rare earth solution (e.g., a solution containing salts of the rare earth minerals and zirconium) with ammonium hydroxide to precipitate all rare earth minerals and zirconium as hydroxides prior to the oxalic precipitation. The filtrate produced is then collected and dried at approximately 60-100° C. to form ammonium sulfate. The precipitate is then reacted with excess oxalic acid to put the zirconium into solution and leave the rare earth as an oxalate precipitate. From the zirconium containing filtrate produced, the zirconia is recovered by treating the filtrate generated by the oxalate precipitation with ammonium hydroxide to form a hydrous zirconia precipitate. This precipitate is subsequently washed and calcined at 1000° C. to form zirconium oxide. The filtrate produced is then collected and dried at approximately 60-100° C. to form ammonium oxalate.

According to a second embodiment, a method is presented for recovering rare earth minerals, which are directly reusable as raw materials from waste materials where zirconia is not present. The processes or products producing these wastes include, for example, phosphors from the recycling of compact fluorescent light bulbs and other phosphor-containing products, electroceramics such as barium neodymium titanate, rare earth-iron alloy magnets, lanthanum manganate fuel cell electrodes, and NiMH batteries. These waste materials are characterized by compounds of scandium, yttrium, lanthanum, cerium, praseodymium, neodymium, samarium, promethium, europium, gadolinium, terbium, dysprosium, erbium, thulium, ytterbium, and lutetium. In addition to the cleaning and preparation methods required for the first embodiment, this embodiment may also require grinding of the waste material. The conversion of materials to oxides may also be required, particularly for rare earth-iron magnets, in order to generate a form that is amenable to further processing by this method. The method of recovering these rare earth materials is comparable to the first embodiment.

In some cases, for example where the waste materials are coated on porous solid objects, such as catalysts, the material may be cut, ground or crushed into smaller sections and dipped into a saturated ammonium sulfate solution and reacted at about 425° C. for approximately 60 minutes to effect the sulfation of the rare earth minerals. The material is then rinsed with water to remove and collect the outer layer containing the rare earth minerals.

In yet another embodiment, zirconia is recovered from zircon, a typical waste from metal casting. In this case the powdered casting waste is mixed with ammonium sulfate in the ratio of 2 moles ammonium sulfate to 1 mole zircon and 7% water is added to form a paste. The mixture is reacted for about 60 minutes at approximately 425° C. The resultant materials are soaked in water and filtered to separate the amorphous $SiO_2$. The filtrate of zirconium sulfate is reacted with ammonium hydroxide to yield a precipitate of hydrous zirconia, which is subsequently washed and calcined at about 1000° C. to form zirconium oxide.

The zirconium can also be separated prior to precipitation of a yttrium compound. One method consists of autoclaving the salt solutions produced from reacting zirconia alloys with ammonium sulfate. Autoclave temperatures of 120° C. cause the formation of a zirconium-containing precipitate, which is washed and calcined to form zirconium oxide. The remaining filtrate is treated with oxalic acid or ammonium oxalate to form rare earth oxalate; the resulting precipitate is washed from one to three times with a 2% oxalic acid solution. Finally, the rare earth precipitate is calcined at 1000° C. to form the rare earth oxide.

Referring to FIG. 1, depicted therein is an exemplary flowchart generally depicting the process employed in accordance with the description above as well as several of the examples described herein, particularly the recovery of rare earth and zirconium oxide materials. The process begins with the introduction of waste material (610), followed by a pre-processing step 614, if necessary, to prepare the waste material. As illustrated, step 614 can include grinding, rinsing, acid leaching, magnetic particle removal and/or milling. Next, at step 618, the waste material sample is consolidated and prepared for reaction in either a powder slug, pelletized form, or disk form, although there may be other forms and consolidation techniques that are suitable depending upon the nature of the waste product. In one embodiment, the oxide material and ammonium sulfate may be consolidated by pressing the combined materials into slugs, pellets, disks, etc.

At step 622, ammonium sulfate is added to the prepared material and the combination is then heated for at least a period of time to enable the reaction. The reacted material is then removed from the heat, cooled and rinsed with water at step 626 to form a salt. Optional step 630 may be carried out, introducing ammonium hydroxide, in order to enable the recovery of ammonium sulfate, for use in subsequent processing of more waste. Next, at steps 634 and 638, a separation operation such as precipitation is carried out. More specifically, in some of the disclosed embodiments an oxalate precipitation agent (e.g., excess oxalic acid or ammonium oxalate) is introduced to the solution to cause the precipitation of the rare earth minerals. And, as characterized in step 638, zirconium rich filtrate can be precipitated with ammonium hydroxide, primarily forming zirconium hydroxide, where the hydroxide can then be filtered, washed and calcined to form zirconium oxide. Step 642 represents heating where, for example, the separated materials undergo a calcination operation to produce an oxide. Also represented, at step 650, is an operation by which ammonium oxalate may be recovered for subsequent use in the process steps described above. For example, ammonium sulfate may be recovered by, prior to oxalic precipitation, reaction of the rare earth solution with ammonium hydroxide to precipitate all rare earth minerals as hydroxides, followed by filtrating, collecting and drying to form ammonium sulfate. Furthermore, the ammonium oxalate may be recovered by collecting and drying the filtrate from the hydroxide precipitation after, of course, the completion of the process; because the separation of the zirconium and rare earth hydroxides from the ammonium sulfate must precede the oxalate reactions with the zirconium and rare earth—which yield a rare earth-oxalate precipitate, along with a zirconium oxalate in solution.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application, including the following examples.

EXAMPLES

The practice of one or more aspects of the disclosed embodiments are illustrated in more detail in the following non-limiting examples.

Example I

Recovery of $Y_2O_3$-Stabilized $ZrO_2$ Waste Material

A waste material containing 20 weight percent $Y_2O_3$ stabilized $ZrO_2$ was obtained from cubic zirconium gem manufacturing. The material was comprised of ball milled powder and mixed with 3 parts ammonium sulfate to one part $Y_2O_3$—$ZrO_2$. Although the particle size may vary, use of a mesh in the range of 20 to 325 (U.S. Mesh), yielding particles in the range of 841 microns to 44 microns, and in particular a 100 mesh (149 microns or less) provided appropriate particles for further processing. In the first case, the materials were fired in an aluminum crucible at 500° C. for 4 hours. Approximately 80% of the residue produced was water soluble, indicating the suitability of this method for processing fused zirconia materials. In the second case, the materials were pressed into a slug and fired in an aluminum crucible for 1 hour at 450° C. Approximately 99% of the residue produced was water soluble, indicating that consolidation enhances the recovery of rare earth minerals from a fused material. In a third case, the materials were pressed into an approximately 0.25 inch thick disk and transferred to an alumina crucible that was preheated to 450° C. and reacted for only 5 minutes. In this case approximately 78% of the residue produced was water soluble, indicating that only a short reaction time is required for substantial reaction. The characterization of the reaction time as "short" is intended to refer to the reaction being mostly completed over a range of only minutes, given the proper consolidation and heating conditions, so that the reaction period need not extend over the range of an hour or more as described in other examples herein. In other words, under proper conditions the reaction can be very efficient with regard to time.

Using the solution of the sulfated $Y_2O_3$-stabilized $ZrO_2$ waste material, excess oxalic acid was added to allow precipitation of yttrium oxalate while preventing precipitation of zirconium oxalate. The yttrium oxalate was filtered from solution, rinsed with an oxalic acid solution, then dried and calcined at 1000° C. to yield yttrium oxide. The zirconium rich portion of the solution was precipitated with ammonium hydroxide, primarily forming hydrous zirconia, which was filtered, washed and calcined at 1000° C. to form an oxide with reduced yttrium content. This demonstrates the separation of the rare earth mineral from the zirconium.

Alternately, ammonium hydroxide was added to the solution of the sulfated $Y_2O_3$-stabilized $ZrO_2$ waste material to form a mixed yttrium-zirconium hydroxide via precipitation. The remaining filtrate was collected and dried at 60° C. to form ammonium sulfate. The mixed yttrium-zirconium hydroxide was further mixed with an excess of oxalic acid in solution so as to allow precipitation of yttrium oxalate while preventing precipitation of zirconium oxalate. The yttrium oxalate was filtered from solution, rinsed with an oxalic acid solution, then dried and calcined at 1000° C. to yield yttrium oxide. The zirconium rich filtrate was then precipitated with ammonium hydroxide, primarily forming zirconium hydroxide. The hydroxide was filtered, washed and calcined at 1000° C. to form zirconium oxide with reduced yttrium content. The filtrate from the zirconium hydroxide precipitation was collected and dried at 60° C. to form ammonium oxalate. This demonstrates not only the separation of the rare earth from the zirconium, but also the recovery of ammonium sulfate and ammonium oxalate, which could then be utilized for subsequent processing of more waste.

Figure 2:
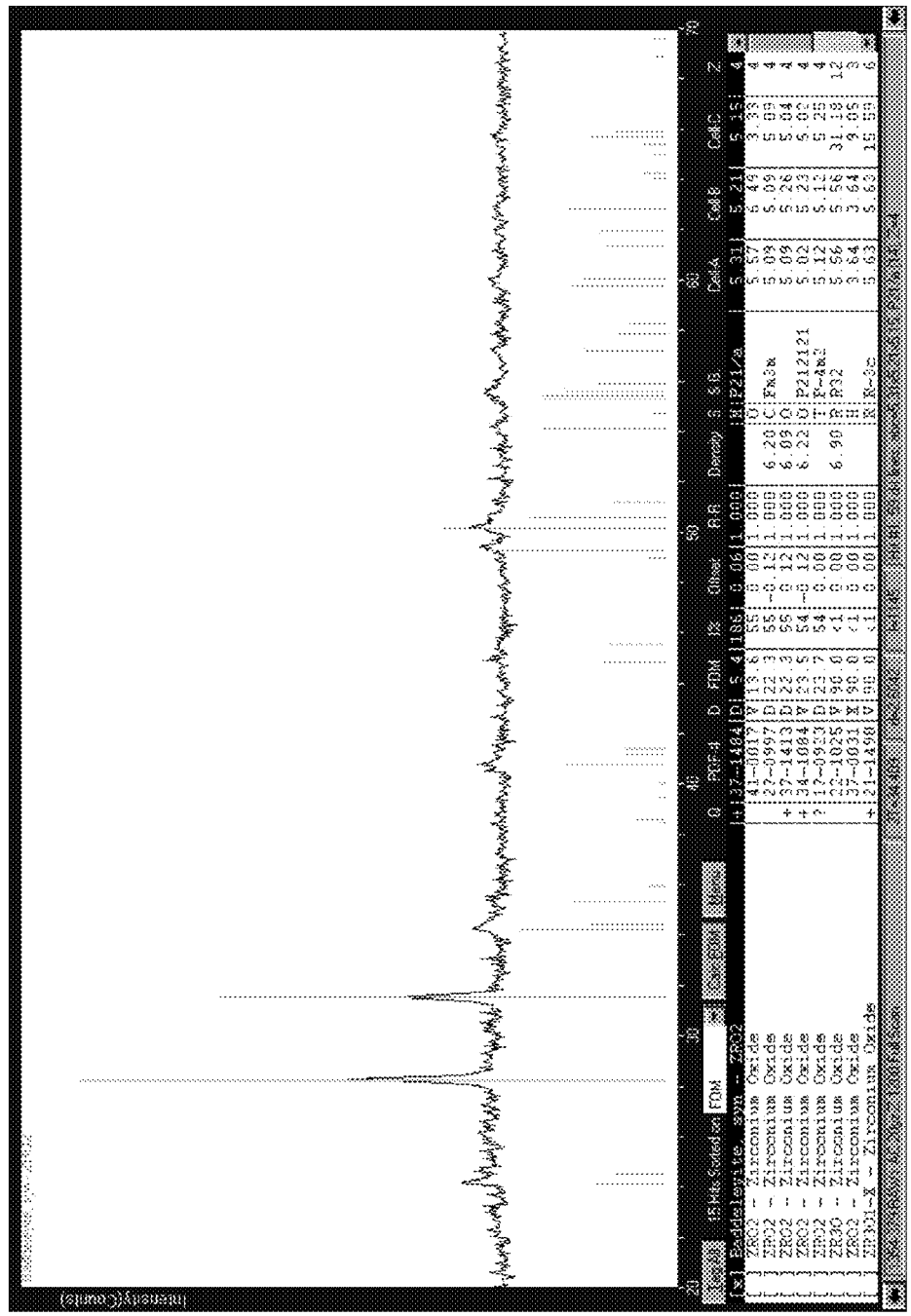
FIGS. 2-6 depict X-ray diffraction plots of recovered rare earth oxides as disclosed in several of the examples.
Figure 3:
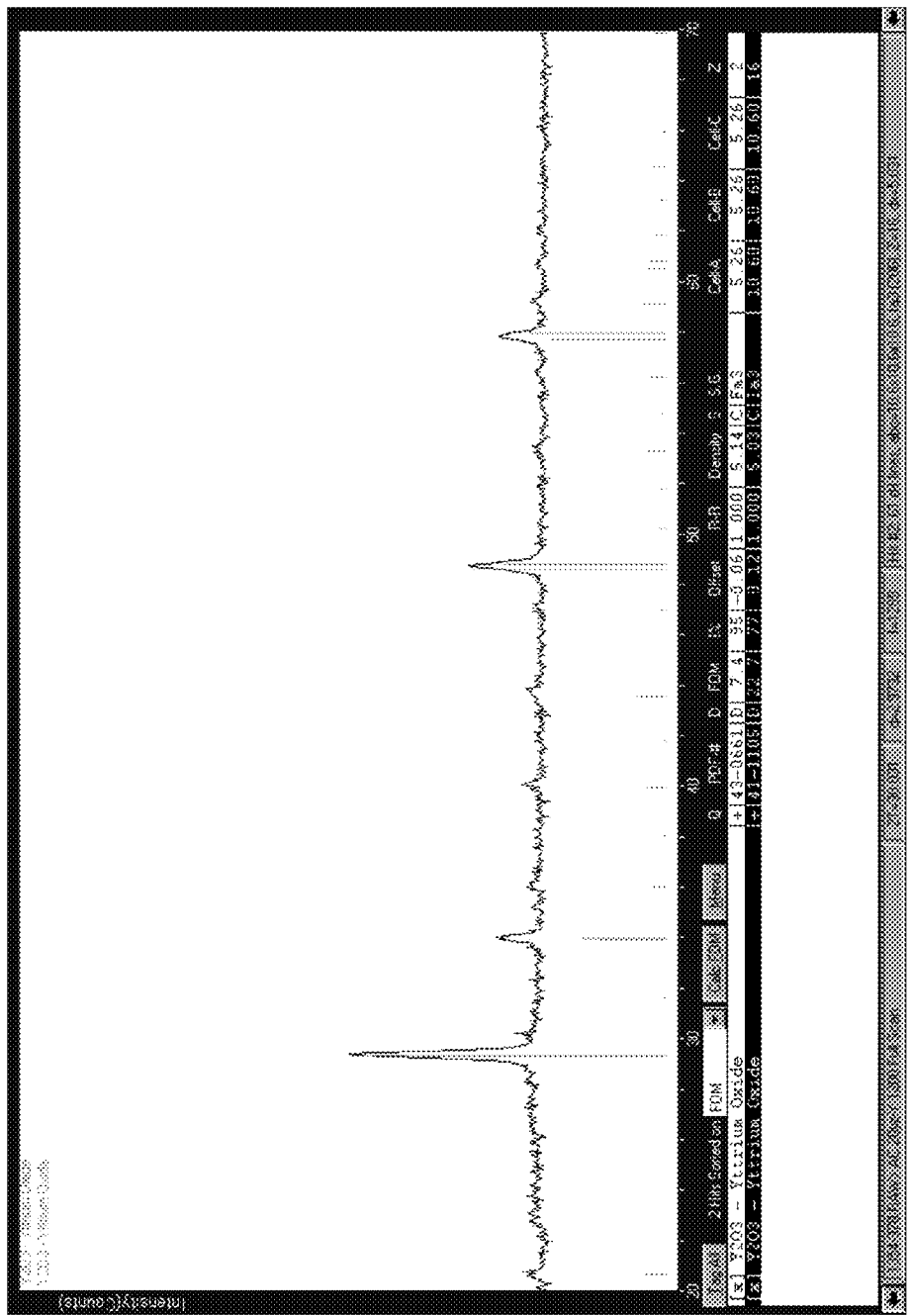

Alternately, the sulfated $Y_2O_3$-stabilized $ZrO_2$ waste material was autoclaved at temperatures of 200° C. to 250° C., at equilibrium pressure in a digestion bomb. In all cases a precipitate was formed; the precipitate was subsequently filtered out, washed and calcined at 1000° C. The resultant oxide was determined by x-ray diffraction (XRD) (See FIG. 2) to consist primarily of monoclinic zirconia, which indicates that the yttrium is not present in the zirconia, as the residual yttrium would stabilize the zirconia to the tetragonal and/or cubic phase. The resultant filtrate was filtered out, washed and calcined at 1000° C. The resultant oxide was determined by XRD to be $Y_2O_3$ (See FIG. 3) based upon the peaks detected. The treatment of the remaining filtrate with ammonium hydroxide results in the absence of precipitate formation, indicating that most, or all, of the zirconium and yttrium were removed in the preceding steps. This demonstrates the removal of the zirconium prior to the collection of the rare earth material.

Example II

Coarse Grade $Gd_2Zr_2O_7$ Electron Beam Physical Vapor Deposition Waste

Figure 4:
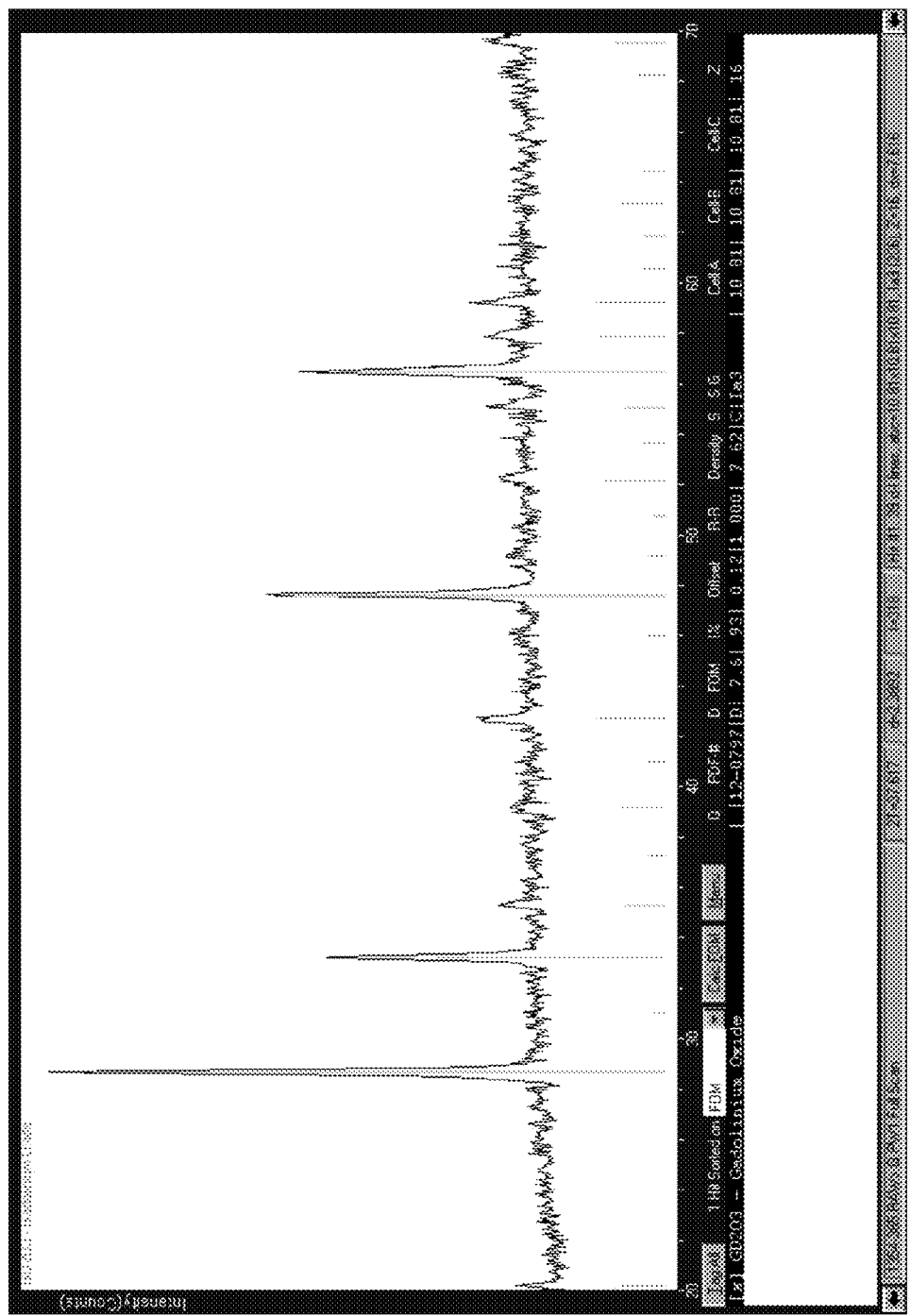

A coarse grade electron beam physical vapor deposition waste was milled to 20 mesh and mixed with ammonium sulfate in the proportion of 1.25 parts ammonium sulfate to 1 part $Gd_2Zr_2O_7$. The materials were transferred to an alumina crucible and fired at 450° C. for 1 hour. Subsequent solution of the residue revealed that approximately 32% was soluble. The unreacted residue was mixed with ammonium sulfate in the proportion of 1.5 parts ammonium sulfate to 1 part $Gd_2Zr_2O_7$ and fired in an alumina crucible at 450° C. for 1 hour. In this case 41% of the residue was soluble. The unreacted residue was mixed with ammonium sulfate in the ratio of 2.5 parts ammonium sulfate to 1 part $Gd_2Zr_2O_7$ and fired in an alumina crucible at 450° C. for 1 hour. In this case 90% of the residue was soluble. For the three runs, 96% of the waste material was solubilized and the presence of $Gd_2O_3$ was confirmed by XRD as illustrated by the peaks of FIG. 4. This demonstrates the use of repeated treatments of this process to recover rare earth minerals from coarse waste materials such as those produced by electron beam physical vapor deposition and thermal barrier coatings.

Example III

Perovskite Fuel Cell Electrode Material ($La_2O_3$—$CeO_2$—$MnO_2$)

Perovskite fuel cell electrode material ($La_2O_3$—$CeO_2$—$MnO_2$) was mixed with ammonium sulfate in proportion of 1 part perovskite powder to 3 parts ammonium sulfate and pressed into a slug. The slug was fired at 450° C. for 1 hour and the resultant product was readily dissolved in deionized water, indicating complete reaction. The rare earth minerals were separated using oxalate precipitation.

Example IV $CeO_2$-Doped $Y_2O_3$—$Al_2O_3$ (YAG) Phosphor

YAG phosphor waste was mixed with ammonium sulfate in the proportion of 3 parts ammonium sulfate to 1 part phosphor powder and pressed into a slug. The mixture was fired at 475° C. for 1 hour and the resultant residue was readily dissolved in deionized water, indicating complete reaction. The $Y_2O_3$ rare earth mineral was separated from the residue by oxalate precipitation. This demonstrates the utility of the process on difficult to recycle YAG phosphors.

Example V

Waste Compact Fluorescent Bulb Phosphors

The waste from a compact fluorescent bulb was first crushed then exposed to a sonic bath to remove its phosphor coating. The glass was filtered out and the phosphor was collected and mixed with ammonium sulfate in the ratio of 3 parts ammonium sulfate to 1 part phosphor. The mixture was pressed into a slug and fired at 450° C. for 1 hour. The resultant residue readily dissolved in deionized water, indicating complete reaction. The rare earth minerals were separated by oxalate precipitation and, after calcining at 1000° C., approximately 48% of the phosphor was recovered as a rare earth oxide.

Example VI

Rare Earth Minerals from Compact NiMH Batteries

Typical NiMH batteries contain about 7% rare earth elements including cerium, lanthanum, neodymium and praseodymium. The NiMH filling was removed from the spent battery and fired at 1000° C. to oxidize it, converting it to NiO and a rare earth oxide-nickel oxide compound. This oxidized waste material was mixed with ammonium sulfate in the ratio of 3 parts ammonium sulfate to 1 part waste material and pressed into a slug. The slug was fired at 450° C. for 1 hour and the residue was dissolved in deionized water. The result was that the bulk of the rare earth material was reacted and dissolved, while most of the NiO was left unreacted. This demonstrates the processing of NiMH battery waste to extract rare earth minerals into solution.

Example VII

Rare Earth Magnet Waste

Rare earth magnet alloys contain several percent of rare earth elements including neodymium, samarium, cerium, lanthanum, praseodymium, and ytterbium. The magnet waste is first crushed and fired at 1000° C. to oxidize it. The oxidized material is then easily pulverized to a powder. This oxide powder is then mixed with ammonium sulfate in the ratio of 3 parts ammonium sulfate to 1 part oxide powder and pressed into a slug. The mixture was fired at 400° C. for 1 hour and then dissolved in deionized water. The bulk of the rare earth material was reacted and dissolved. The rare earths were then separated from the solution by oxalate precipitation. An excess of oxalic acid is added to allow precipitation of neodymium oxalate while preventing precipitation of iron oxalate. A light purple oxalate resulted, which was filtered and rinsed with an oxalic acid solution, then dried and calcined at 1000° C. to yield neodymium oxide.

Example VIII

Stripping of Electron Beam Physical Vapor Deposition and Thermal Barrier Coatings Electron beam physical vapor deposition and thermal barrier coatings contain a super alloy with 7 weight percent $Y_2O_3$ and 93 weight percent $ZrO_2$. In order to recover these materials, the coatings must first be stripped off their respective parts. The coated parts are heated to 400° C. in a crucible and sufficient ammonium sulfate is sprinkled on top of the component surfaces to melt the coating and form a liquid layer, completely covering the component. The temperature is held for at least 10 minutes and the coatings are removed, cooled and rinsed. The process is repeated five times to remove all of the coating.

Example IX

Automotive and Woodstove Combustion Catalysts

Figure 5:
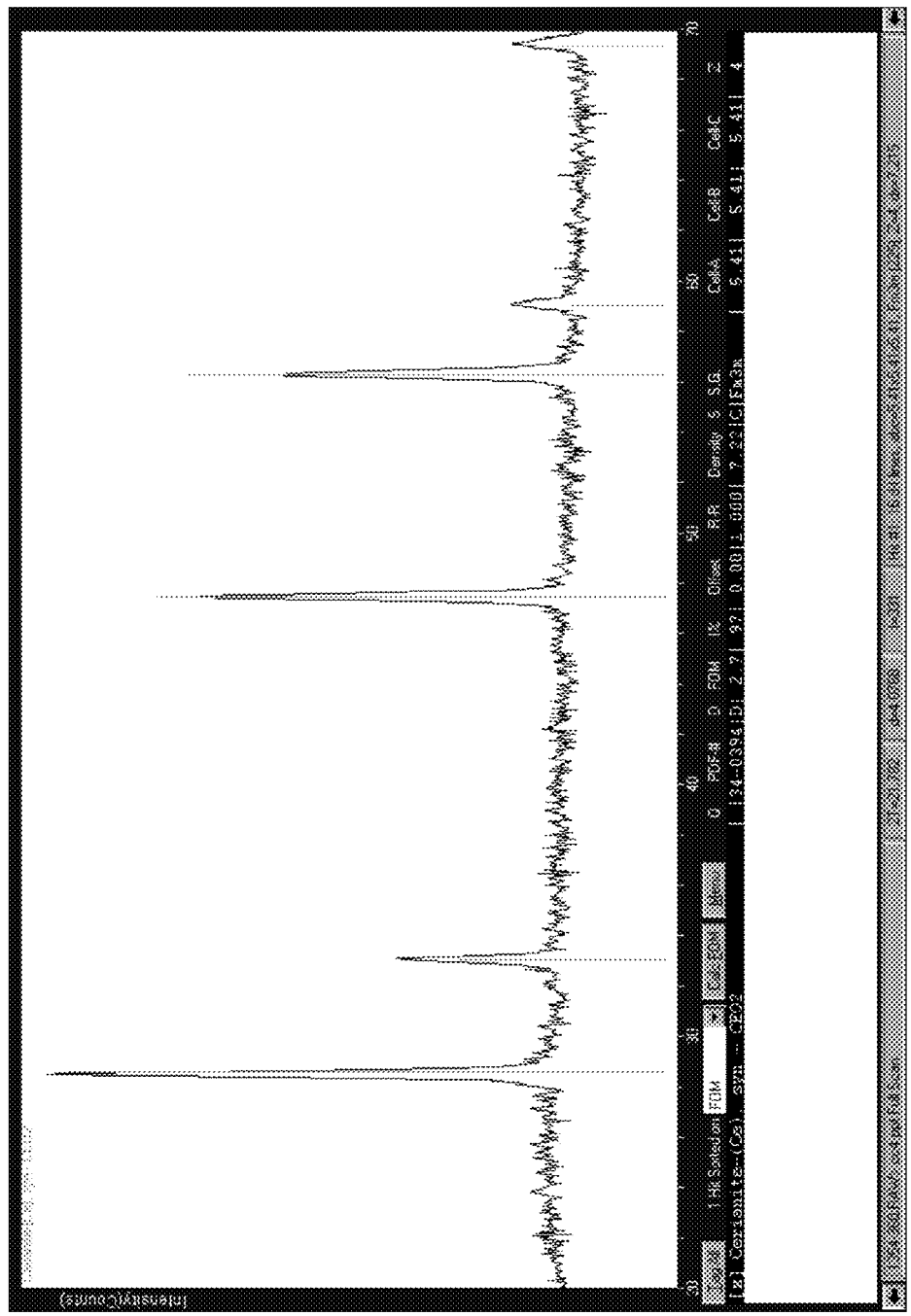

The automotive catalyst honeycomb material is cut into sections and dipped into a saturated ammonium sulfate solution and reacted for 60 minutes at 425° C. The catalyst material is then rinsed with water and exhibits a reduction in mass of approximately 22% as the result of the removal of the outer catalyst layer. The removed material is approximately 6.8% particulate by mass, while the remainder consists of dissolved salts. The solids are separated from the solution by filtration and the cerium is separated from the filtrate by precipitation via oxalic acid. The precipitate of cerium oxalate is collected and calcined at 1000° C. to form cerium oxide, as demonstrated by the peaks detected in the x-ray diffraction of FIG. 5. Approximately 5.3% of the total substrate mass is recovered as cerium oxide, based on the original substrate mass.

Figure 6:
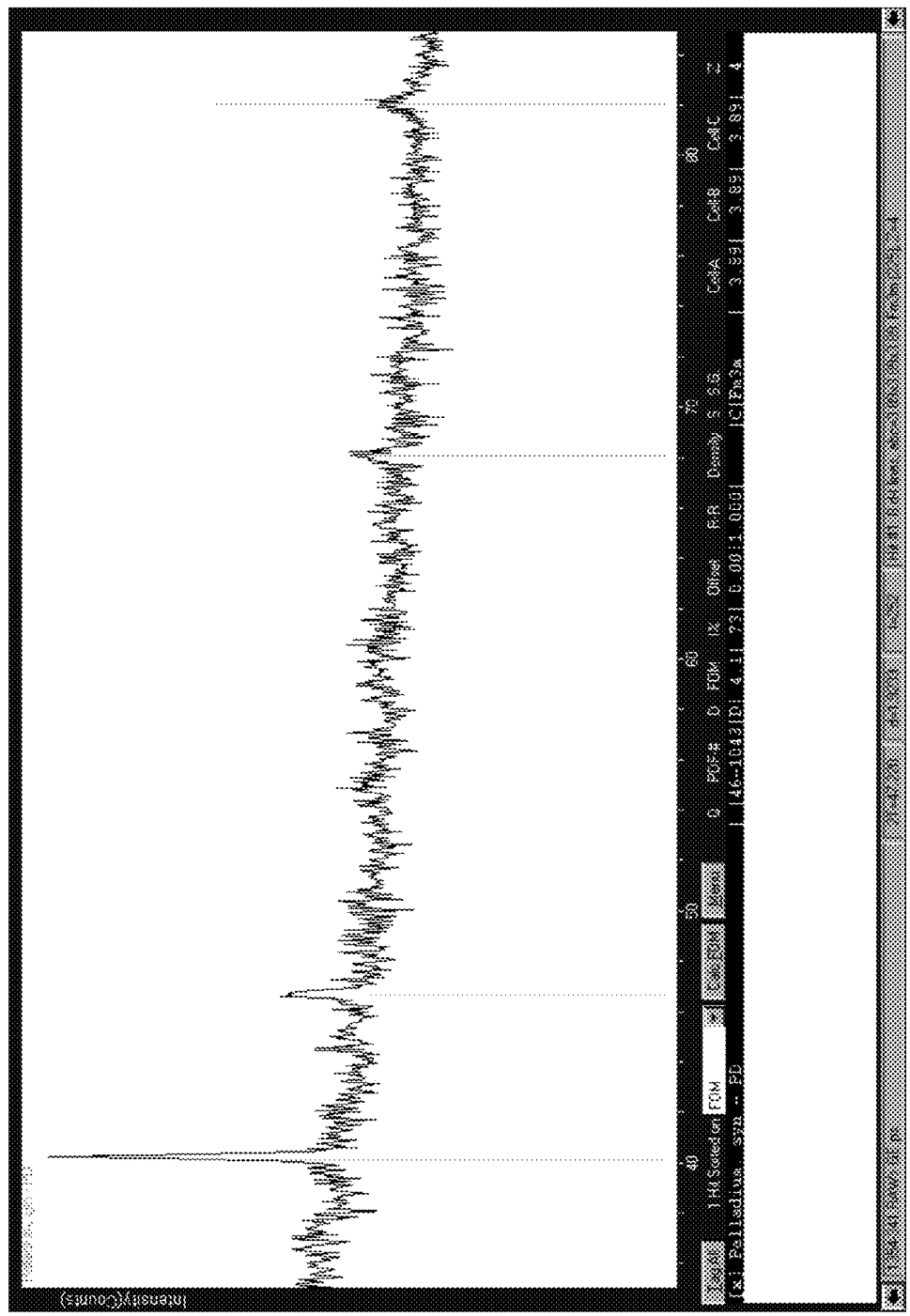

Similarly, a woodstove combustion catalyst honeycomb material is broken into large chunks and mixed with 2 parts ammonium sulfate to one part catalyst material. The mixture is reacted for about 60 minutes at 425° C. in a pyrex beaker. The catalyst material is then rinsed with water and exhibits a reduction in mass of approximately 4% from the original mass, resulting from the removal of the outer catalyst layer. The removed material is comprised of fine particulate and dissolved salts. The solids are separated from the solution and are determined using XRD to contain the catalyst palladium, a platinum group metal (i.e., ruthenium, rhodium, palladium, osmium, iridium, and platinum). Referring to FIG. 6, the presence of palladium is confirmed by, for example, the signature peaks as detected using x-ray diffraction. The palladium was further separated by dissolving it in fresh Aqua Regia; the solution was filtered, evaporated and fired at 900° C. to form palladium metal.

These examples demonstrate the utility of the method to extract not only rare earths but also, optionally, platinum metal group metals from catalyst materials.

Example X

Rare Earth Containing Electronic Waste $BaNd_2Ti_4O_{12}$ waste material is a byproduct of the production of electronic tape cast material. The material, once milled, is a fine grain tape cast waste material. It was mixed with 3 parts ammonium sulfate to one part waste materials and 10% water was added to form a paste. The paste was reacted for 60 minutes at 425° C. in a pyrex pan. The reacted material was treated with water and filtered. The solid that was filtered was determined by XRD to be $BaSO_4$. The filtrate was treated with excess oxalic acid and the resulting precipitate that formed was filtered, dried and calcined at 1000° C. The resultant material was determined by x-ray diffraction to be $Nd_2O_3$. The filtrate was treated with ammonium hydroxide and the resulting precipitate that formed was filtered, dried and calcined at 1000° C. The resultant material was determined by x-ray diffraction to be $TiO_2$. This demonstrates the recycling of rare earth electroceramic materials which contain barium and/or titanium. A similar result would be possible with rare earth modified lead-zirconia-titanate.

Example XI

Zircon from Zirconia

Zircon (a typical waste from metal casting) is ground and thermally decomposed before being passed through a −325 mesh. More specifically, ground Zircon and a coarser fused/thermally decomposed Zircon (beads of $ZrO_2$ and $SiO_2$ from a plasma prepared powder) were processed with 3 parts ammonium sulfate to one part $Y_2O_3$—$ZrO_2$. The materials were mixed and approximately 7% water was added to form a paste that was further mixed in a Pyrex beaker. The paste was then reacted for about 60 min at 425° C. The reacted material was then soaked in water and the solids were separated by filtration. Based upon an initial analysis, less than 10% of the ground zircon reacted, whereas approximately 30% of the fused material was reacted. Subsequently the fused material was reacted for a total of three times to achieve nearly full extraction of the zirconium, where the residual material was shells of amorphous $SiO_2$. Based upon the results achieved, thermal decomposition improved the recycling process.

It will be appreciated that various above-disclosed embodiments, examples and other features and functions, or alternatives thereof, may be desirably modified and combined into different methods or applications. Also, various presently unforeseen or unanticipated alternatives, modifications, variations or improvements therein may be subsequently made by those skilled in the art which are also intended to be encompassed by the following claims.

What is claimed is:

1. A method for the recovery, in reusable form, of rare earth minerals from oxide waste material containing rare earth and zirconia, comprising:
   a. mixing an ammonium sulfate powder with a powder containing the oxide waste material;
   b. firing the mixture at a temperature sufficient to decompose the oxide waste material and thereby produce a residue which is, to a large degree, soluble in an aqueous solution;
   c. dissolving the residue in water to obtain a solution that includes rare earth constituents in salt form; and
   d. separating rare earth constituents from the solution using at least one separation method wherein at least one rare earth constituent is suitable for use as a raw material.

2. The method according to claim 1 wherein the waste material includes compounds selected from the group consisting of oxides of scandium, yttrium, lanthanum, cerium, praseodymium, neodymium, samarium, europium, gadolinium, terbium, dysprosium, erbium, ytterbium and mixtures thereof with zirconia.

3. The method according to claim 1 wherein the waste material is a byproduct of a process selected from the group consisting of: thermal spray coating, electron beam vapor deposition, green machining of dental materials, and cubic zirconium gem production.

4. The method according to claim 1 wherein the waste material include coatings and wherein removal of the coatings from parts further includes:
   a. heating a coated part to at least 400 ° C.;
   b. applying a sufficient amount of ammonium sulfate to at least a portion of the coated part to melt and form a liquid layer generally covering the portion of the part;
   c. holding the temperature of at least 400 ° C. for at least 10 minutes;
   d. removing the part from the heat, cooling and rinsing the part; and
   e. repeating (a) - (d) above to remove all of the coating from the part.

5. The method according to claim 1 further comprising cleaning the waste material using at least one method selected from the group consisting of: magnetic removal, acid leaching; and water rinsing.

6. The method according to claim 1 wherein the oxide waste material and ammonium sulfate are individually pulverized before mixing.

7. The method according to claim 1 wherein the oxide waste material and ammonium sulfate are consolidated after mixing.

8. The method according to claim 1 where the oxide waste material and ammonium sulfate are mixed together in proportion of at least 1 mole of ammonium sulfate to 6 moles of oxide waste material.

9. The method according to claim 1 wherein the rare earth constituents are separated from the solution using a method selected from the group consisting of: ion-exchange, solvent extraction, fractional crystallization and precipitation.

10. The method according to claim 1 wherein the rare earth constituents are separated from the solution by precipitation of rare earths using an oxalate precipitation agent.

11. The method according to claim 10 in which the rare earth precipitate is washed at least once with a solution containing an ammonium oxalate.

12. The method according to claim 10 wherein zirconia is recovered from a filtrate, produced when the rare earth constituents are separated from the solution by precipitation of rare earths using an oxalate precipitation agent, by:
   a. reaction of the filtrate with ammonium hydroxide to form a hydrous zirconia precipitate;
   b. washing the hydrous zirconia precipitate; and
   c. calcining the washed hydrous zirconia precipitate at about 1000° C. to form zirconium oxide.

13. The method according to claim 10 further comprising the recovery of ammonium sulfate.

14. The method according to claim 1 wherein zirconium constituents are separated from the solution prior to the rare earth constituents by precipitation of the zirconium constituents via autoclave treatment of the solution at temperatures of at least 180° C.

15. The method according to claim 11 further comprising recovery of ammonium sulfate and recovery of ammonium oxalate.

16. A method for the recovery of rare earth minerals from rare earth waste materials, comprising:
   a. mixing an ammonium sulfate powder with a powder containing the rare earth waste material;
   b. firing the mixture at temperatures sufficient to decompose the rare earth waste material and thereby produce a residue, wherein at least a portion of the residue is soluble in aqueous solution;
   c. dissolving the soluble portion of the residue in water to obtain a solution which comprises the rare earth constituents in salt form;
   d. separating rare earth constituents from the solution using at least one separation method, wherein at least one rare earth constituent is suitable for use as a raw material.

17. The method according to claim 16 wherein the rare earth waste materials are byproducts of processes selected from the group consisting of: phosphors collected from compact fluorescent light bulbs and other phosphor-containing products, rare earth-iron alloy magnets, lanthanum manganate fuel cell electrodes, rare earth-containing catalysts, rare earth-containing electroceramics, and NiMH batteries.

18. The method according to claim 16 wherein the rare earth waste materials are selected from the group consisting of: scandium, yttrium, lanthanum, cerium, praseodymium, neodymium, samarium, europium, gadolinium, terbium, dysprosium, erbium, and ytterbium.

19. The method according to claim 16 wherein the rare earth waste material is obtained using a process comprising:
   a. reducing the rare earth waste material to smaller sections;
   b. immersing the smaller sections into a saturated ammonium sulfate solution;
   c. reacting the sections; and
   d. rinsing the reacted sections with water to remove at least an outer layer containing rare earth material.

20. The method according to claim 16 wherein the rare earth waste materials are converted to usable form by at least one of the methods selected from the group consisting of: grinding the rare earth waste materials, and heating non-oxide waste materials in oxidizing conditions to convert them to oxides.

21. The method according to claim 16 wherein the rare earth waste materials are cleaned using at least one method selected from the group consisting of: magnetic removal of tramp iron materials, acid leaching and water rinsing.

22. The method according to claim 16 wherein the rare earth waste material and ammonium sulfate are individually pulverized before mixing.

23. The method according to claim 16 wherein the rare earth waste material and ammonium sulfate are consolidated after mixing.

24. The method according to claim 16 where the rare earth waste material and ammonium sulfate are mixed together in proportion of at least 1 mole of ammonium sulfate to 6 moles of rare earth waste material.

25. The method according to claim 16 in which an oxalate precipitation agent is used to form a rare earth precipitate.

26. The method according to claim 25, wherein said one separation method includes adding ammonium hydroxide to the solution to precipitate all rare earth constituents as rare earth hydroxide precipitates, and separating the rare earth hydroxide precipitates from the solution, and where ammonium sulfate is recovered by drying the remaining solution to form ammonium sulfate.

27. The method according to claim 16 wherein rare earth minerals are recycled from rare earth waste materials that include spent catalyst material.

28. The method according to claim 16 wherein platinum group metals are recycled from rare earth waste materials that include spent catalyst material.

29. The method according to claim 19 wherein the rare earth waste materials being processed include catalyst substrates.

30. The method according to claim 19 wherein an outer layer containing rare earth waste material includes platinum group metals.

31. A method for the recovery of zirconia from zircon waste materials, comprising:
   a. at least partially fusing and solidifying the zircon waste materials;
   b. mixing an ammonium sulfate powder with a powder containing the zircon waste materials;
   c. firing the mixture at temperatures sufficient to decompose the zircon waste materials and thereby produce a residue, wherein at least a portion of the residue is soluble in aqueous solution;
   d. dissolving the soluble portion of the residue in water to obtain a solution which comprises zirconia in salt form;
   e. filtering out any insoluble components from the solution;
   f. separating the zirconia from the solution using precipitation of hydrous zirconia by adding ammonium hydroxide; and
   g. washing and calcining the hydrous zirconia to form zirconium oxide which can be reused as a raw material.

32. The method according to claim 31 wherein the zircon waste materials are byproducts of metal casting operations.

* * * * *